(12) United States Patent
Nakayama

(10) Patent No.: US 7,640,033 B2
(45) Date of Patent: Dec. 29, 2009

(54) RADIO COMMUNICATION APPARATUS AND TRANSMISSION POWER CONTROL METHOD

(75) Inventor: Masahiko Nakayama, Tokyo (JP)

(73) Assignee: NEC Corporation, Tokyo (JP)

(*) Notice: Subject to any disclaimer, the term of this patent is extended or adjusted under 35 U.S.C. 154(b) by 617 days.

(21) Appl. No.: 11/248,231

(22) Filed: Oct. 13, 2005

(65) Prior Publication Data

US 2006/0089105 A1 Apr. 27, 2006

(30) Foreign Application Priority Data

Oct. 21, 2004 (JP) ............... 2004-307009

(51) Int. Cl.
H04B 7/00 (2006.01)
H04Q 7/20 (2006.01)

(52) U.S. Cl. ............ 455/522; 455/69; 455/126; 455/574

(58) Field of Classification Search ......... 455/522, 455/126, 127.1, 69, 115.1, 68, 70, 139, 574, 455/127.5, 67.11, 343.1–5; 370/335, 342
See application file for complete search history.

(56) References Cited

U.S. PATENT DOCUMENTS 6,347,231 B1 * 2/2002 Miya ............... 455/522
6,438,387 B1 * 8/2002 Ichikawa ........... 455/522
2002/0160799 A1 * 10/2002 Kanemoto et al. ..... 455/522
2005/0245217 A1 * 11/2005 Dantoni et al. ........ 455/139

FOREIGN PATENT DOCUMENTS

| JP | 11-308126 | 11/1999 |
|---|---|---|
| JP | 2001-223637 | 8/2001 |
| JP | 2003-023360 | 1/2003 |
| JP | 2003-163630 | 6/2003 |
| JP | 2004-064242 | 2/2004 |
| JP | 2004-208180 | 7/2004 |

* cited by examiner

Primary Examiner—John Lee
(74) Attorney, Agent, or Firm—Whitham Curtis Christofferson & Cook, PC

(57) ABSTRACT

A transmission power control information section issues an indication to a variable gain control amplifier at a predetermined control cycle. The variable gain control amplifier controls a transmission power according to the given indication amount. An adjustment amount generator adjusts the indication amount to be given to the variable gain control amplifier while maintaining a change in the transmission power between an indication from a transmission power control information section and subsequent indication within a predetermined range.

18 Claims, 6 Drawing Sheets

RADIO COMMUNICATION APPARATUS AND TRANSMISSION POWER CONTROL METHOD

BACKGROUND OF THE INVENTION

1. Field of the Invention

The present invention relates to a radio communication apparatus such as a mobile phone (cellular phone) and particularly, to transmission power control for the radio communication apparatus.

2. Description of the Related Art

In a Code Division Multiple Access (CDMA) mobile communication system, a transmission power from a radio communication apparatus such as a mobile phone is variably controlled. That is, a transmission power from a plurality of mobile stations is controlled such that a base station can receive a signal that has been transmitted from the mobile stations at a constant power. This reduces interference between communication channels due to effects of near-far problem in a communication system using a plurality of mobile stations and allows a frequency resource to be effectively used.

To this end, in the CDMA mobile communication system, the transmission power control needs to be strictly performed. In a wide-area CDMA (W-CDMA) mobile communication system that has been developed by a 3GPP (3rd Generation Partnership Project), the maximum allowance and accuracy of the transmission power are specified. In this W-CDMA mobile communication system, the transmission power needs to be controlled in high accuracy by a small step size (1 dB, 2 dB or 3 dB) over a wide power range.

In transmission power control (TPC) in the W-CDMA mobile communication system, two TPC algorisms (TPC algorism is also referred to as "Power Control Algorism (PCA)") are used. In "Algorithm 1", a transmission power is controlled in every one slot. In "Algorithm 2", a transmission power is controlled in every five slots. "Slot" is a unit of time direction and one slot corresponds to 0.6666 µsec (=2560 chip (1 chip=1/3.84 MHz)). Accordingly, transmission power controls are performed 1500 times per second in "Algorithm 1" and 300 times per second in "Algorithm 2". Further, in "Algorithm 1", power control of 1 dB or 2 dB is performed at one time (per one slot). In "Algorithm 2", power control of 1 dB is performed at one time (per five slots).

However, the linearity of input power versus output power of a power amplifier (hereinafter, referred to as merely "PA") used in the TPC decreases in a high output state due to a variety of factors, so that the absolute accuracy of the transmission power decreases in general as the transmission power becomes higher. In addition to such a behavior in a saturation region of the PA, the transmission power may not be controlled to a desired value in some cases in a radio circuit of a mobile phone due to an error in values of an analog element (analog error), temperature characteristics of respective devices, an error (ripple) in frequency characteristics of a filter, and the like.

To improve the above disadvantage, various methods have been proposed. One of them is a method that compensates (corrects) a transmission power by feedback control to increase the accuracy of the control (refer to, for example, JP-A Nos. 11-308126, 2001-223637, and 2004-208180).

As a feedback system for increasing the accuracy of power control, one makes the transmission power that has been actually supplied and transmission power that has been set by the TPC equal to each other. This system is called Automatic Power Control (APC) or Automatic Level Control (ALC) and compares a measurement value of the power that has been actually transmitted and a value that has been set by the TPC to obtain an error amount between them and feeds back the error amount for adjustment.

Further, in order to compensate an error at the portion where the setting value of the transmission power is high (in the vicinity of the maximum transmission power) in particular, a mechanism in which the APC becomes effective when the transmission power becomes higher than a predetermined threshold to allow compensation of the transmission power to operate is adopted in general. This is because a power range that a widely-used diode detector can detect is restricted. If the power range is extended, a circuit configuration becomes complicated to increase cost.

FIG. 1 is a graph showing an example of a normal relation between a setting value in the TPC and transmission power. In FIG. 1, line 1a represents an ideal transmission power. Dotted line represents a threshold value for making the APC effective (ON). When the transmission power becomes higher than the threshold value, the APC becomes effective. Curved lines 1b and 1c represent a transmission power that has not been compensated by the APC. The portion where the transmission power is less than the threshold value, that is, where the APC is not effective is the curved line 1b. The portion where the transmission power is higher than the threshold value, that is, where the APC should be effective is the curved line 1c.

The actual transmission power does not completely correspond to the ideal line 1a due to an analog error and the like. Although the transmission power deviates from the line 1a in the range where the transmission power is low, influence of the error is small. Therefore, the deviation is still within an allowable range even if the APC is not effective. In FIG. 1, although the curved line 1b deviates from the line 1a due to an analog error and the like, the deviation is relatively small.

On the other hand, influence of the analog error and the like is large in the range where the transmission power is high, so that the APC needs to be effective. In FIG. 1, the curved line 1c deviates greatly from the line 1a due to various errors in analog devices (temperature characteristics, frequency characteristics, adjustment error, etc.). Further, in the case of a transmission power setting value for the non-linear area of the PA, an error is not a quantitative value, so that a simple compensation processing is not enough. In this case, therefore, it is necessary to extend the threshold value and compensate the transmission power by means of the APC.

In the APC, the control of the transmission power is so performed as to cancel the error. That is, a compensation amount that brings the curved line 1c close to the line 1a is added.

The curved lines 1b and 1c in FIG. 1 are lower than the line 1a. However, the curved lines 1b and 1c may become higher than the line 1a in some cases.

Conventionally, in order to bring the transmission power close to a desired value as quickly as possible, the compensation of the transmission power by the APC has been performed in every one slot. In this case, the waveform of the transmission power that has been compensated by the APC does not correspond to the waveform to be obtained in the TPC as a transitional behavior in terms of temporal change.

In a radio communication apparatus provided with a conventional APC function, in order to bring an actual transmission power close to a target transmission power as quickly as possible, the control of the transmission power is performed in every one slot time which is a base unit irrespective of timing that has been specified by a higher layer or algorithm. Therefore, even in the case where an instruction to perform the transmission control in every five slots according to algorithm 2 in the TPC is issued, the control may be performed in every one slot in the APC in some cases. As a result, the obtained waveform of the transmission power considerably differs from a waveform desired in the TPC. That is, in the case where an error amount between the ideal transmission power and actual transmission power is large, a transmission power waveform to be obtained in the APC cannot be obtained at the boundary between ON zone and OFF zone due to influence of response time (time needed to reach convergence) in the APC.

In the conventional radio communication apparatus, the transmission power is increased or decreased by 1 dB in each 5-slot cycle at the portion other than the boundary. At the boundary portion, the control of the transmission power is not performed according to the regular operation. 3GPP specifies that the transmission power should not be changed during TPC control cycle as a general rule. In this regard, since a given error is allowed for the transmission power in 3GPP, it is not always true that the conventional operation deviates from the specification in dependence on a change in the amount of the power. However, it can be said at least that a power change different from that the base station assumes in the TPC is shown, so that there is a possibility that the conventional operation has adversely affected the interference between channels and frequency use efficiency.

SUMMARY OF THE INVENTION

An object of the present invention is to provide a radio communication apparatus in which a power change due to a change in the state of APC between transmission power controls performed by the TPC has been suppressed.

To solve the above object, according to a first aspect of the present invention, there is provided a radio communication apparatus which performs transmission power control and further adjusts the transmission power, the radio communication apparatus comprising: a variable gain control amplifier which controls the transmission power according to an indication amount which has been supplied thereto; a transmission power control information section which issues the indication amount to the variable gain control amplifier at a predetermined control cycle; an adjustment amount generation section which adjusts the indication amount issued from the transmission power control information section to the variable gain control amplifier while maintaining, within a predetermined range, a change in the transmission power between an indication from the transmission power control information section and subsequent indication in the case where the control cycle is longer than an adjustment cycle of the transmission power.

According to a second aspect of the present invention, there is provided a transmission power control method for a radio communication apparatus which controls a transmission power of a variable gain control amplifier according to an indication amount which has been supplied thereto and further adjusts the transmission power, the method comprising the steps of: indicating the indication amount to the variable gain control amplifier at a predetermined control cycle; and adjusting the indication amount while maintaining, within a predetermined range, a change in the transmission power between an indication and subsequent indication in the case where the control cycle is longer than an adjustment cycle of the transmission power.

According to the present invention, it is possible to perform adjustment while maintaining a change in the transmission power between an indication of transmission power control and subsequent indication within a predetermined range, thereby satisfactorily suppressing a power change between transmission power controls.

DETAILED DESCRIPTION OF THE PREFERRED EMBODIMENTS

Embodiments of the present invention will be described below in detail with reference to the accompanying drawings.

Figure 1:
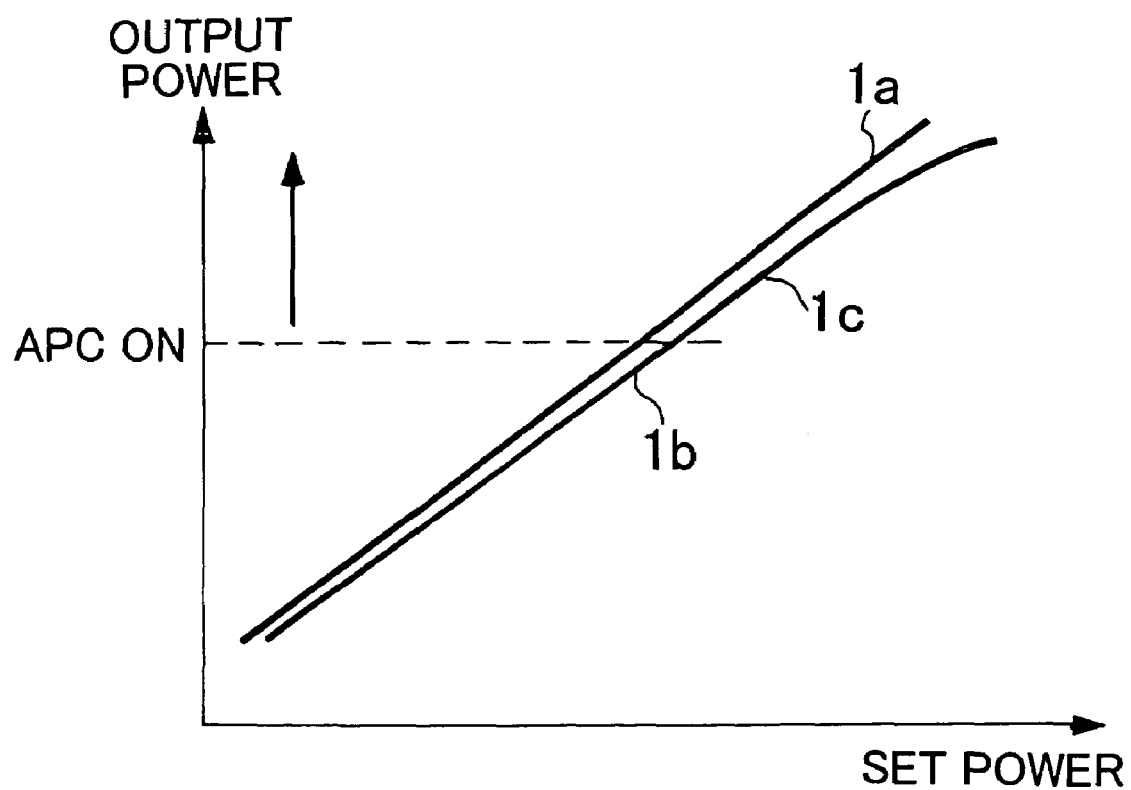
FIG. 1 is a graph showing an example of a normal relation between a setting value in the TPC and transmission power.
Figure 2:
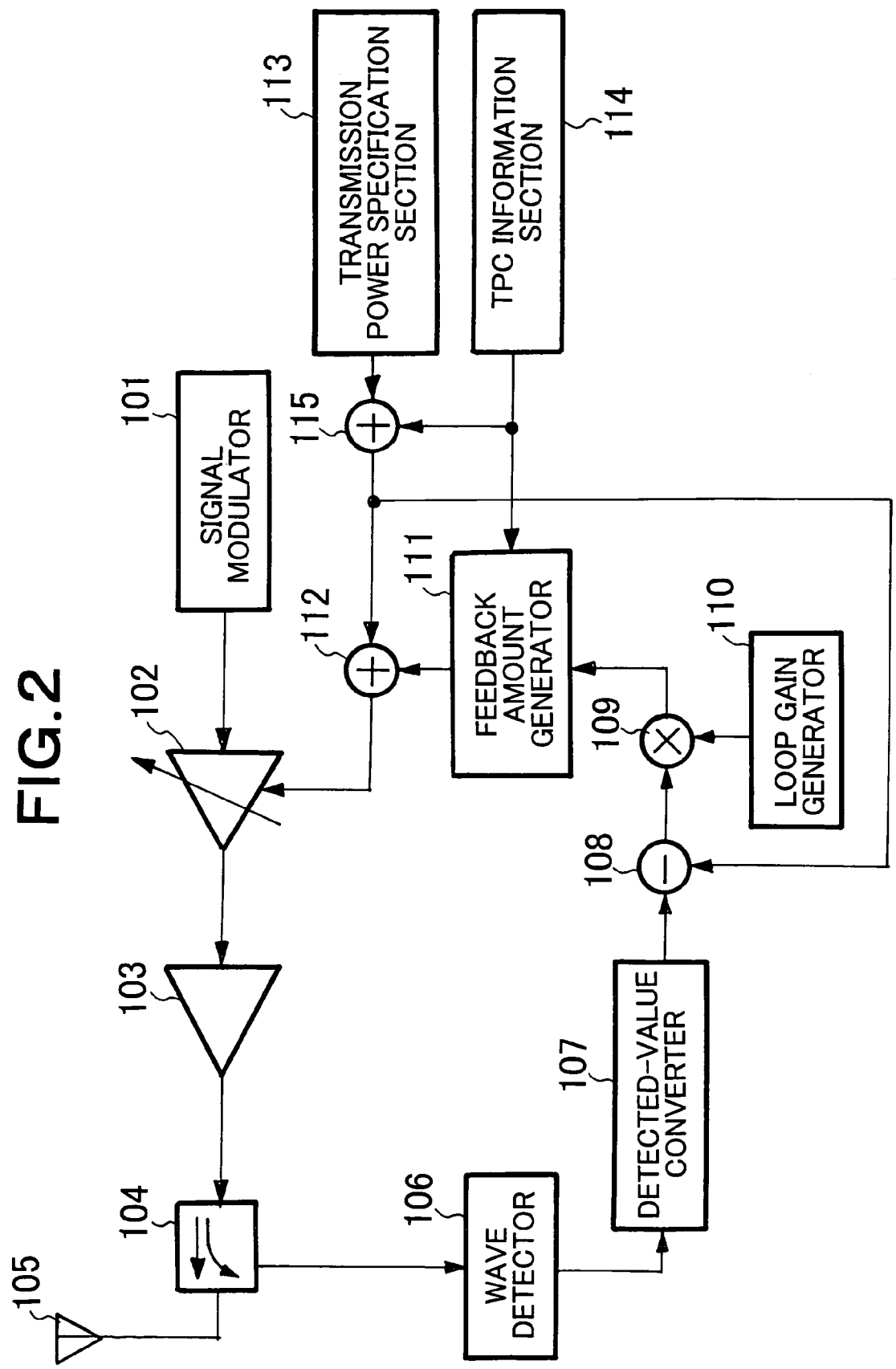
FIG. 2 is a block diagram showing a configuration of a mobile phone according to a first embodiment of the present invention.

FIG. 2 is a block diagram showing a configuration of a mobile phone according to a first embodiment of the present invention. Since the present invention relates to a configuration of the transmission part of a radio communication apparatus, FIG. 2 shows the transmission part of a mobile phone.

A mobile phone according to the embodiment of the present invention is configured to use APC that uses feedback control to compensate a transmission power controlled by means of TPC from a base station, and configured to turn the APC ON/OFF as needed. For example, when a transmission power is equal to or higher than a threshold, the APC is turned ON; whereas when a transmission power is lower than a threshold, the APC is turned OFF.

As shown in FIG. 2, the mobile phone according to the first embodiment has signal modulator 101, gain control amplifier (hereinafter, referred to as merely "GCA") 102, PA 103, directional coupler 104, antenna 105, wave detector 106, detected-value converter 107, error detector 108, loop gain multiplier 109, loop gain generator 110, feedback amount generator 111, control amount adder 112, transmission power specification section 113, TPC information section 114, and a TPC power amount adder 115.

The signal modulator 101 modulates a transmission signal to adapt it to a radio (wireless) environment and sends the modulated transmission signal to the GCA 102. In a W-CDMA system, the modulation performed in the signal modulator 101 includes error-correction coding, spread modulation, filtering, and the like.

The GCA 102 sends, to the PA 103, the transmission signal having a transmission power that has been adjusted to a desired value according to a set value given from the control adder 112.

The PA 103 amplifies the transmission signal that has been modulated and whose transmission power has been adjusted, to a level at which the transmission signal can be radiated as a radio wave and sends the amplified transmission signal to the directional coupler 104.

The directional coupler 104 divides the transmission signal from the PA 103 and sends the divided signals to the antenna 105 and wave detector 106, where the transmission power is to be detected.

The antenna 105 radiates the amplified transmission signal.

The transmission signal which is a main signal is processed as described above. In addition to the above components, matching circuits of respective devices, a transmission filter that performs band-limiting, a synthesizer that sets a frequency, and the like are involved in the signal processing.

In addition to the flow of the main signal, there is an APC feedback system. The wave detector 106, detected-value converter 107, error detector 108, loop gain multiplier 109, feedback amount generator 111, control amount adder 112, loop gain generator 110, transmission power specification section 113, and TPC power amount adder 115 are included in the feedback system.

The wave detector 106 detects the transmission power of the amplified transmission signal that has been amplified in the PA 103 and sends the detected voltage value to the detected-value converter 107. In this case, envelope detection is performed, and the output of the wave detector 106 is a voltage value.

The detected-value converter 107 converts the voltage value that has been detected in the wave detector 106 into a power value and sends it to the error detector 108. For example, 1.84 V in a voltage value is converted into 24.93 dBm in a transmission power value. A relation between the voltage value and power value in the detected-value conversion depends on the characteristics of a wave detection diode. The characteristics of the wave detection diode should be previously measured in a stable state of the radio communication apparatus so as not to be influenced by temperature characteristics and set the measurement result in the detected-value converter 107 as a table. The detected-value converter 107 converts a voltage value into a power value while referring to the table.

The error detector 108 compares the transmission power setting value sent from the TPC power amount adder 115 and power value that has been converted in the detected-value converter 107 and sends a transmission power error obtained as the comparison result to the loop gain multiplier 109.

The loop gain multiplier 109 multiplies the transmission power error that has been detected in the error detector 108 by a loop gain value supplied from the loop gain generator 110 and sends the obtained error value to the feedback amount generator 111.

The feedback amount generator 111 integrates the error amount sent from the loop gain multiplier 109 to obtain a feedback amount to be fed back to the transmission power setting value and sends it to the control amount adder 112. The feedback amount generator 111 updates the feedback amount of the APC at the same timing as update of TPC indication information. When the TPC indication information is updated in each 1-slot cycle in "algorithm 1", the feedback amount generator 111 updates a feedback amount in each 1-slot cycle. When the TPC indication information is updated in each 5-slot cycle in "algorithm 2", the feedback amount generator 111 updates a feedback amount in each 5-slot cycle.

The control amount adder 112 adds the feedback amount to the transmission power setting value sent from the TPC power amount adder 115 and supplies the GCA 102 with the obtained value.

The loop gain generator 110 supplies the loop gain multiplier 109 with a loop gain value.

The transmission power specification section 113 specifies the initial value of the transmission power (transmission power indication value) with a dB value.

The TPC information section 114 judges the instruction (UP/DOWN) in the TPC based on a reception signal from a base station (not shown) and sends TPC indication information to the TPC power amount adder 115 and feedback amount generator 111.

The TPC power amount adder 115 adds a value obtained based on the TPC indication information sent from the TPC information section 114 to the transmission power specification value and sends the obtained value to the control amount adder 112 and error detector 108 as transmission power setting value.

The APC feedback system may be configured in any suitable manner with hardware or software.

Figure 3:
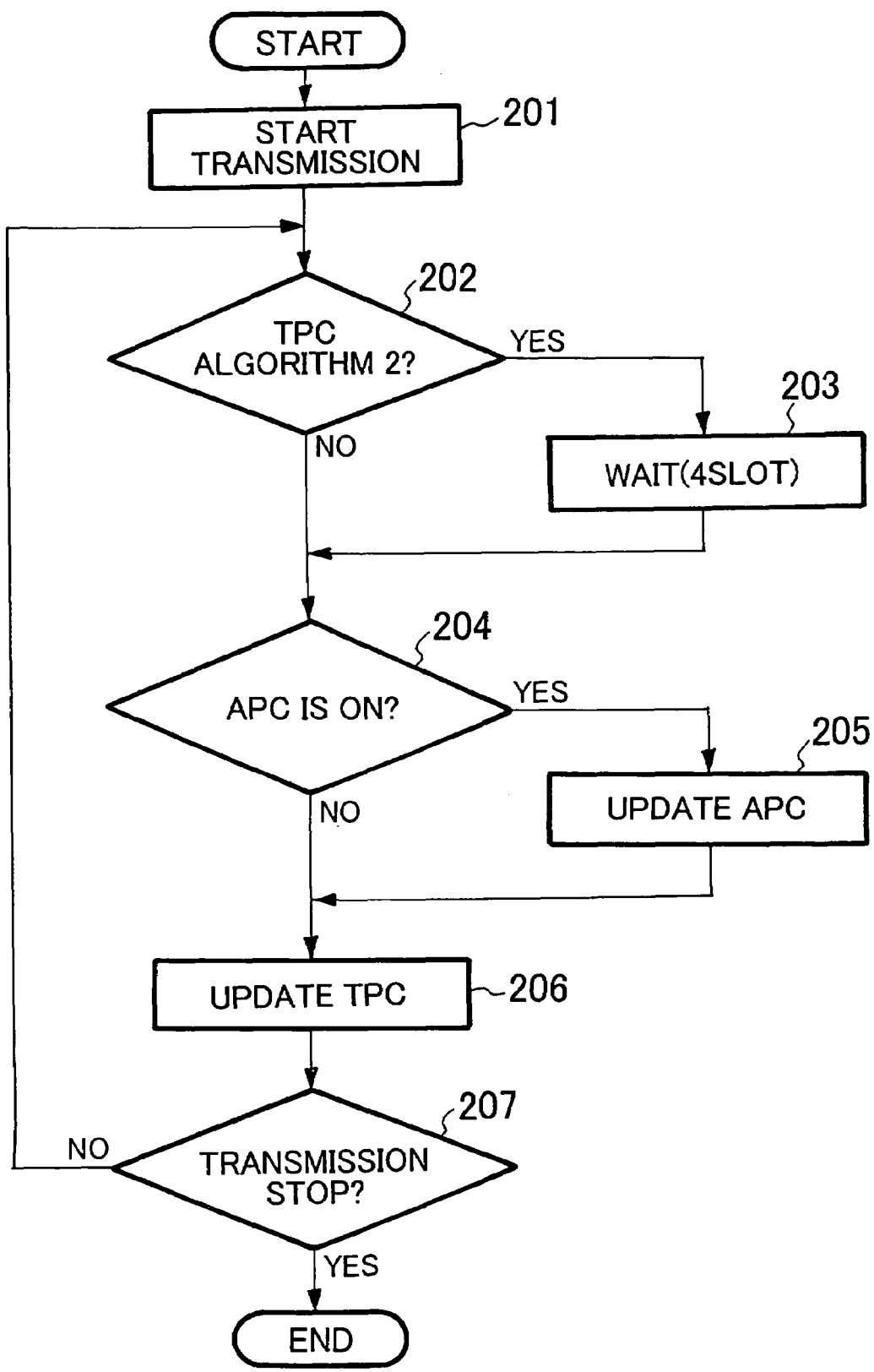
FIG. 3 is a flowchart showing operation of a mobile phone according to the first embodiment of the present invention.

FIG. 3 is a flowchart showing operation of a mobile phone according to the first embodiment of the present invention. The flowchart of FIG. 3 mainly shows the processing performed in the feedback amount generator 111.

Firstly, the signal modulator 101 starts transmitting of a signal (step 201). Next, the feedback amount generator 111 judges whether "algorithm 1" or "algorithm 2" is being used in the TPC (step 202). When judging that "algorithm 2" is being used, the feedback amount generator 111 does not update the feedback amount of the APC, but waits a certain time corresponding to 4-slot cycle (step 203).

After waiting a certain time corresponding to 4-slot cycle in step 203, or when judging, in step 202, that "algorithm 1" is being used, the feedback amount generator 111 judges whether the APC is ON or OFF (step 204).

When judging that the APC is ON, the feedback amount generator 111 updates the feedback amount (step 205). On the other hand, the feedback amount generator 111 does not update the feedback amount when judging that the APC is OFF.

Next, the TPC information section 114 updates the TPC indication information based on the reception signal from the base station (step 206).

When a transmission stop instruction has not been issued from an upper layer, the processing flow returns to step 202. On the other hand, when a transmission stop instruction has been issued from an upper layer, the transmission is stopped and the processing flow is ended (step 207).

Figure 4:
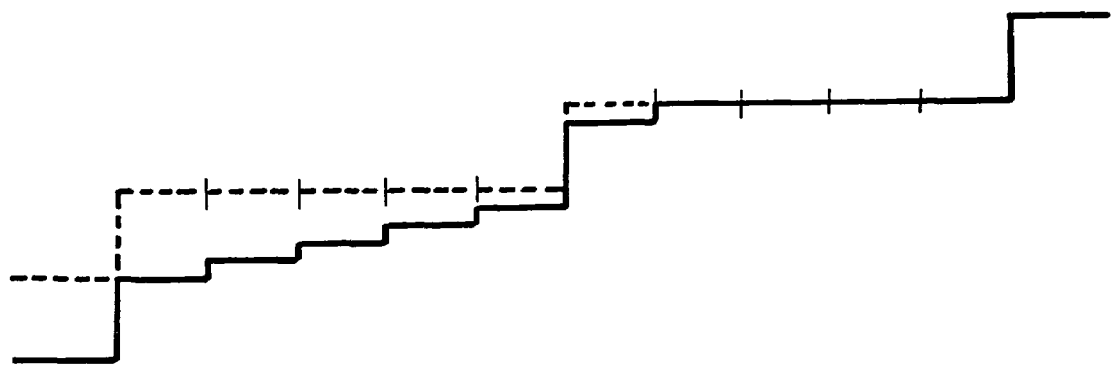
FIG. 4 is a graph showing an example of a change in the transmission power in a conventional mobile phone.
Figure 5:
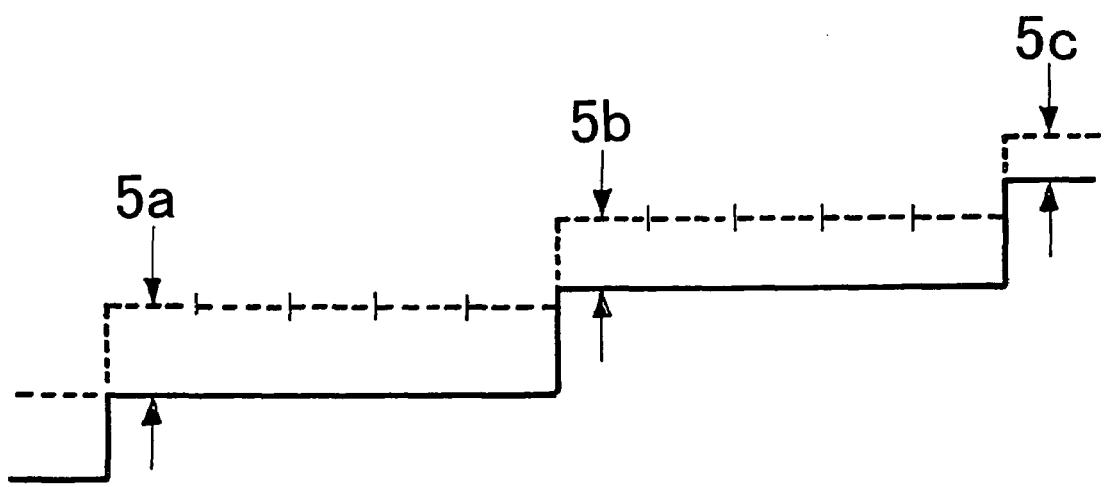
FIG. 5 is a graph showing an example of a change in the transmission power in the mobile phone according to the embodiment of the present invention.

FIG. 4 is a graph showing an example of a change in the transmission power in a conventional mobile phone. FIG. 5 is a graph showing an example of a change in the transmission power in the mobile phone according to the embodiment of the present invention. In each of FIGS. 4 and 5, the dotted line represents a transmission power indicated in the TPC, and the solid line represents an actual transmission power controlled by the TPC and APC.

As described above, a transmission power must be kept constant during each 5-slot cycle in "algorithm 2". However, since the APC has been performed in every one slot in the conventional mobile phone, a transmission power is changed by the APC during 5-slots which is a TPC control cycle as shown in FIG. 4 although the transmission power is quickly brought close to a target power value. On the other hand, in the mobile phone according to the present embodiment, the APC is performed in step with the control cycle of the TPC. As a result, a transmission power is gradually compensated to be brought close to an accurate transmission power while the transmission power is kept constant during each 5-slot cycle as shown in FIG. 5. That is, in FIG. 5, difference 5*b* is smaller than difference 5*a* and difference 5*c* is smaller than difference 5*b*.

As described above, according to the present embodiment, the feedback amount generator 111 updates the feedback amount of the APC in step with the cycle of the TPC in the case where the control cycle of the TPC is longer than the adjustment cycle of the APC feedback control. As a result, a power change due to a change in the state of APC between transmission power controls performed by the TPC can be suppressed.

Further, the feedback amount generator 111 updates the feedback amount of the APC with the same timing as the TPC, so that a power change due to a change in the state of APC between transmission power controls performed by the TPC can be reduced to zero.

Further, although the control cycle of the TPC is variable because "algorithm 1" or "algorithm 2" is selected, the update timing of the feedback amount of the APC is performed in accordance with the control timing of the selected algorithm. As a result, a power change between the TPC controls can be suppressed even if the control cycle is switched.

A second embodiment of the present invention will be described below.

A mobile phone according to the second embodiment has the same configuration as that of the first embodiment which is shown in FIG. 2 except for the operation of the feedback amount generator 111.

Figure 6:
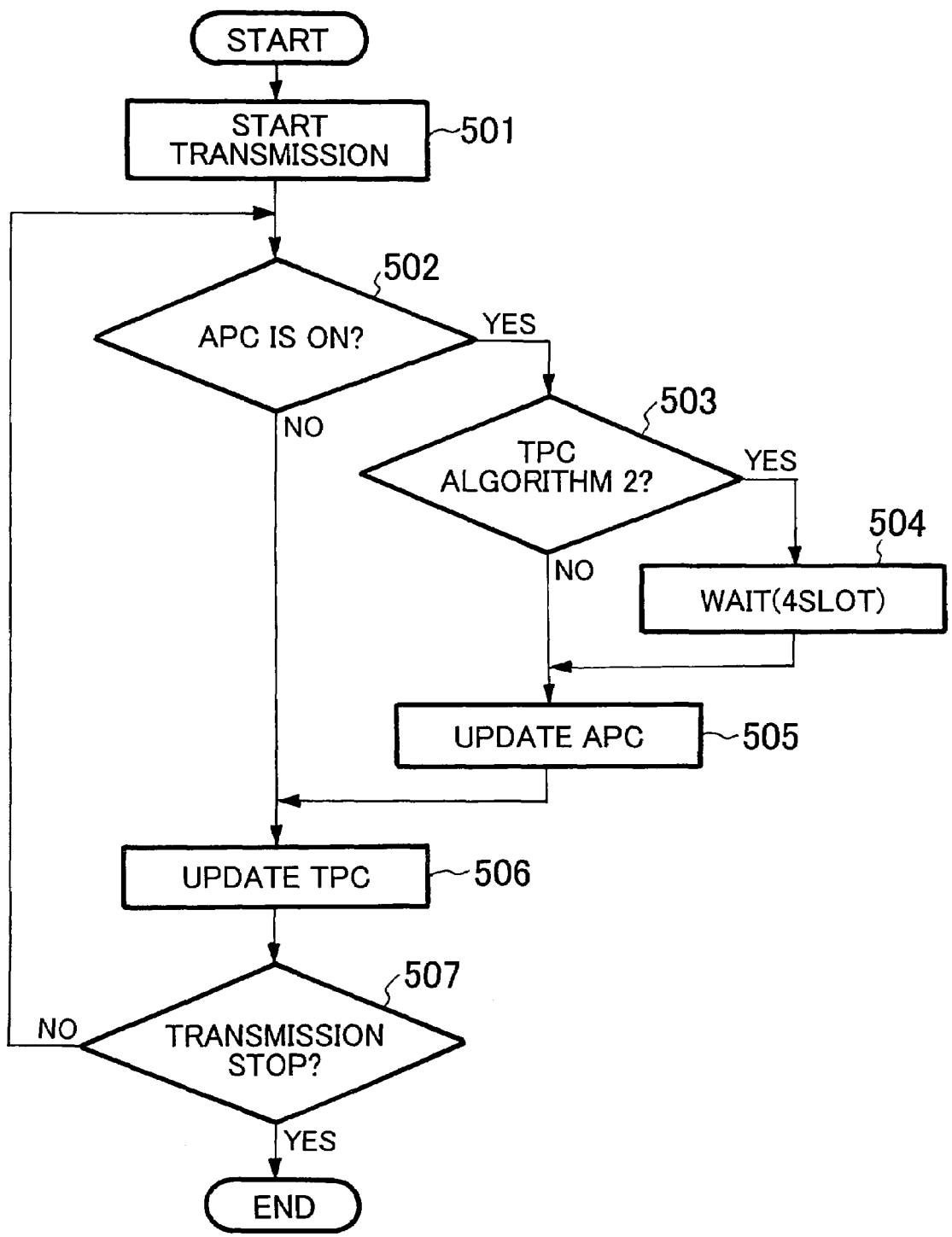
FIG. 6 is a flowchart showing operation of a mobile phone according to a second embodiment of the present invention.

FIG. 6 is a flowchart showing operation of the mobile phone according to the second embodiment of the present invention. In the second embodiment, unlike the processing flow shown in FIG. 3, it is judged firstly whether the APC is ON or OFF and then judged whether "algorithm 1" or "algorithm 2" is used if the APC is ON.

As shown in FIG. 6, firstly, the signal modulator 101 starts transmitting of a signal (step 501). Next, the feedback amount generator 111 judges whether the APC is ON or OFF (step 502).

When determining that the APC is ON, the feedback amount generator 111 judges whether algorithm used in the TPC is "algorithm 1" or "algorithm 2" (step 503). When judging that "algorithm 2" is used, the feedback amount generator 111 does not update the feedback amount of the APC, and waits a certain time corresponding to 4-slot cycle (step 504).

After waiting a certain time corresponding to 4-slot cycle in step 504, or when judging, in step 503, that "algorithm 1" is used, the feedback amount generator 111 updates the feedback amount of the APC (step 505).

After updating the APC in step 505 or when judging, in step 502, that the APC is OFF, the TPC information section 114 updates a TPC indication information based on a reception signal from the base station (step 506).

When a transmission stop instruction has not been issued from an upper layer, the processing flow returns to step 502. When a transmission stop instruction has been issued from an upper layer, the transmission is stopped and the processing flow is ended (step 507).

As described above, according to the second embodiment, the feedback amount generator 111 judges ON/OFF state of the APC first, so that if the APC is OFF, the feedback amount generator 111 need not judge the algorithm being used and wait a certain time corresponding to 4-slot cycle, allowing circuit operation of a CPU or DSP to be stopped, which reduces a power consumption in hardware and a software load.

Further, according to the second embodiment, it is possible to reduce a consumption power in hardware and software load during the time period when the APC is OFF in a radio communication apparatus that turns the APC ON/OFF according not to the transmission power level, but to another condition. For example, in a radio communication apparatus that turns ON the APC to compensate a transmission power in the case where an adjustment value becomes out of a predetermined range due to secular change of devices and the like, the APC stays in an OFF state for a given period of time after manufacturing time. In this case, it is possible to reduce a consumption power in hardware and software load during the time period when the APC is OFF.

The present invention is also applicable to a radio communication apparatus that turns ON/OFF the APC based on temperature measurement information, which can be taken as another example of the condition according to which the APC is turned ON/OFF, in order to compensate a change in the device's temperature by using the APC.

Further, the operation according to the present embodiment may be applied to the case where a configuration in which an analog adjustment is applied to only a specified frequency and the APC is used to compensate other frequencies is adopted in a radio communication apparatus utilizing a plurality of frequencies (channels).

A third embodiment of the present invention will be described below.

A mobile phone according to the third embodiment has the same configuration as that of the first embodiment which is shown in FIG. 2 except for the operation of the feedback amount generator 111.

Figure 7:
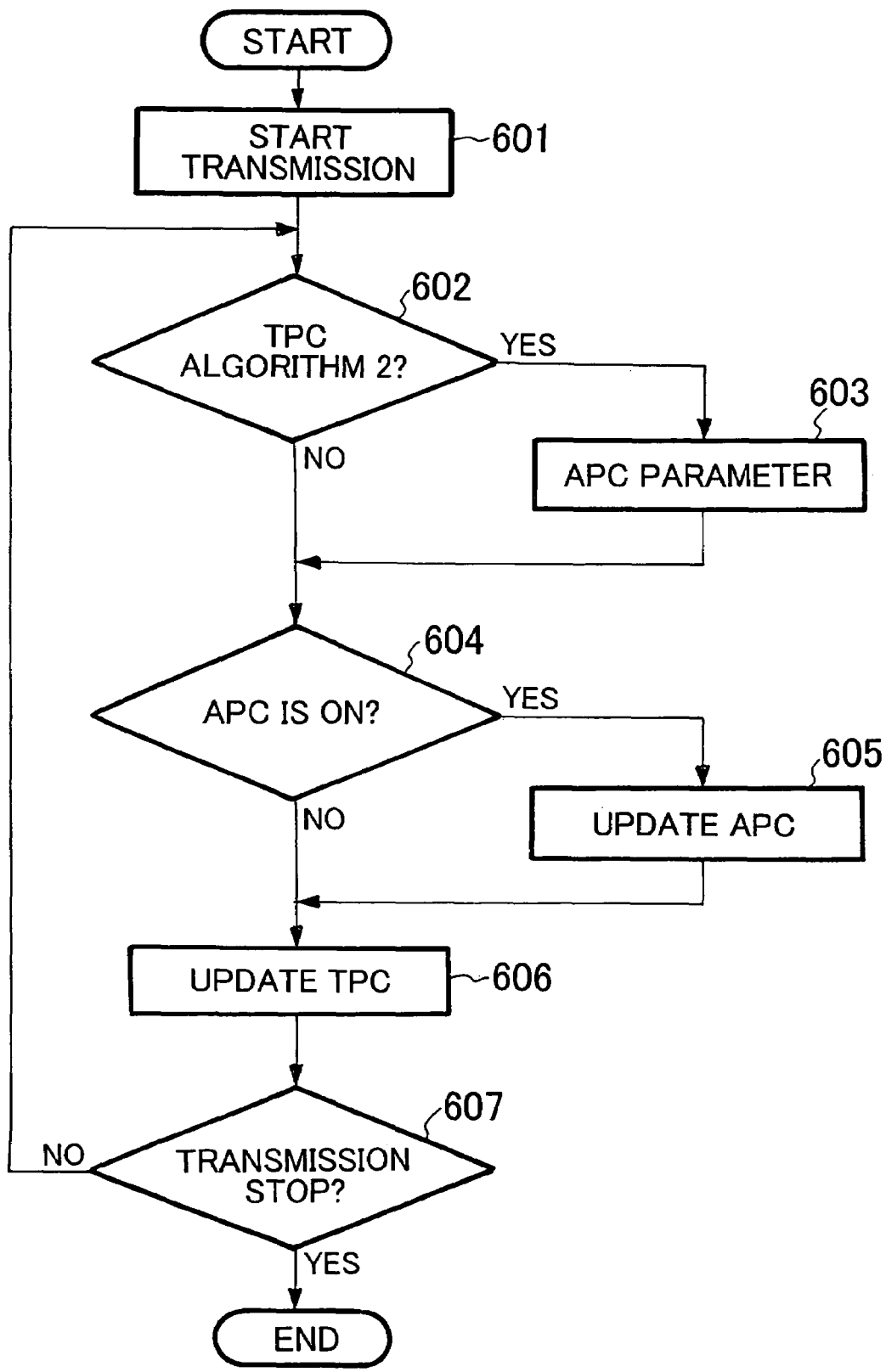
FIG. 7 is a flowchart showing operation of a mobile phone according to a third embodiment of the present invention.

FIG. 7 is a flowchart showing operation of the mobile phone according to the third embodiment of the present invention. In the third embodiment, unlike the processing flow according to the first embodiment which is shown in FIG. 3, the feedback amount generator 111 does not wait a certain time corresponding to 4-slot cycle in the case where "algorithm 2" is used, but changes a parameter used in the APC according to the selected algorithm.

The processing of steps 601, 602, 604 to 607 are the same as that of the steps 201, 202, 204 to 207 in FIG. 3. Step 603 in FIG. 7 is different from the step 203 in FIG. 3. When determining, in the step 602, that "algorithm 2" is used, the feedback amount generator 111 applies a parameter for "algorithm 2" to the APC (the step S603).

Since the APC is a feedback circuit, various parameters are prepared for it in order to prevent oscillation and allow a transmission power to quickly converge to a desired value. By changing the parameter so as to reduce a change in the amount of the transmission power in a single APC update, it is possible to reduce a change in the transmission power between one TPC and the subsequent TPC within a predetermined range.

In this case, as a parameter for "algorithm 2", a value that delays the time point at which the transmission power is converged to a target value by the APC should be used. For example, a parameter such as a loop gain value to be used in the loop gain multiplier 109, a forgetting coefficient to be multiplied by an integration value of the feedback amount to be used in the feedback amount generator 111, or a compensation amount limiter value that limits a compensation amount in a single compensation should be set to a value that delays the convergence time.

As described above, according to the third embodiment, the feedback amount generator 111 uses a parameter that delays the time point at which the transmission power is converged to a target value by the APC when "algorithm 2" is used for the TPC. As a result, it is possible to reduce a change in the transmission power between one TPC and the subsequent TPC.

What is claimed is:

1. A radio communication apparatus which performs transmission power control and further adjusts the transmission power, comprising:
    a variable gain control amplifier which controls the transmission power according to an indication amount which has been supplied thereto;
    a transmission power control information section which issues the indication amount to said variable gain control amplifier at a predetermined control cycle;
    an adjustment amount generation section which adjusts the indication amount issued from said transmission power control information section to said variable gain control amplifier while maintaining, within a predetermined range, a change in the transmission power between an indication from said transmission power control information section and subsequent indication in the case wherein the control cycle is longer than an adjustment cycle of the transmission power.

2. The radio communication apparatus according to claim 1, wherein
    said adjustment amount generation section adjusts the indication amount in sync with the control cycle.

3. The radio communication apparatus according to claim 2, wherein
    said transmission power control information section uses any of a plurality of algorithms having the control cycles different from one another to perform the transmission power control, and
    said adjustment amount generation section turns ON the adjustment for the indication amount when a predetermined condition is satisfied, judges whether the adjustment is ON or OFF when a control timing according to the algorithm used in the transmission power control information section comes, and adjusts the indication amount in the case where the adjustment is ON.

4. The radio communication apparatus according to claim 2, wherein
    said transmission power control information section uses any one of a plurality of algorithms having the control cycles different from one another to perform the transmission power control, and
    said adjustment amount generation section turns ON the adjustment for the indication amount when a predetermined condition is satisfied and adjusts the indication amount when a control timing according to the algorithm used in said transmission power control information section comes in the case where the adjustment is ON.

5. The radio communication apparatus according to claim 3, wherein
    the predetermined condition is satisfied when the transmission power is equal to or higher than a predetermined threshold value.

6. The radio communication apparatus according to claim 4, wherein
    the predetermined condition is satisfied when the transmission power is equal to or higher than a predetermined threshold value.

7. The radio communication apparatus according to claim 1, wherein
    said transmission power control information section uses any one of a plurality of algorithms having the control cycles different from one another to perform the transmission power control, and
    said adjustment amount generation section reduces a change in the transmission power between an indication in the used algorithm and subsequent indication within a predetermined range according to the algorithm used in said transmission power control information section.

8. The radio communication apparatus according to claim 7, wherein
    said adjustment amount generation section feeds back a difference between the transmission power and indication amount to the indication amount thereby adjusting the indication amount.

9. The radio communication apparatus according to claim 8, wherein
    said adjustment amount generation section selects a parameter for a feedback circuit thereby reducing a change in the transmission power within the predetermined range.

10. A transmission power control method for a radio communication apparatus which controls a transmission power of a variable gain control amplifier according to an indication amount which has been supplied thereto and further adjusts the transmission power, said method comprising the steps of:
    indicating the indication amount to said variable gain control amplifier at a predetermined control cycle by a transmission power control information section; and
    adjusting the indication amount while maintaining, within a predetermined range, a change in the transmission power between an indication and subsequent indication in the case by an adjustment amount generation section wherein the control cycle is longer than an adjustment cycle of the transmission power.

11. The transmission power control method according to claim 10, wherein
    the indication amount is adjusted in sync with the control cycle by the adjustment amount generation section.

12. The transmission power control method according to claim 11, wherein
    the transmission power control is performed by using any one of a plurality of algorithms having control cycles different from one another and, in the case where the adjustment for the indication amount is turned ON when a predetermined condition is satisfied, operation of judging whether the adjustment is ON or OFF when a control timing according to the used algorithm comes is carried out and the indication amount is adjusted in the case where the adjustment is ON.

13. The transmission power control method according to claim 11, wherein
    the transmission power control is performed by using any one of a plurality of algorithms having control cycles different from one another and, in the case where the adjustment for the indication amount is turned ON when a predetermined condition is satisfied, the indication amount is adjusted when a control timing according to the used algorithm comes in the case where the adjustment is ON.

14. The transmission power control method according to claim 12, wherein
    the predetermined condition is satisfied when the transmission power is equal to or higher than a predetermined threshold value.

15. The transmission power control method according to claim 13, wherein
    the predetermined condition is satisfied when the transmission power is equal to or higher than a predetermined threshold value.

16. The transmission power control method according to claim 10, wherein in the case where the transmission power control is performed by using any one of a plurality of algorithms having control cycles different from one another, a change in the transmission power between an indication in the used algorithm and subsequent indication is reduced within a predetermined range according to the used algorithm.

17. The transmission power control method according to claim 16, wherein the indication amount is adjusted by feeding back to the indication amount a difference between the transmission power and indication amount.

18. The transmission power control method according to claim 17, wherein a change in the transmission power is reduced within the predetermined range by selecting a parameter for a feedback circuit.

* * * * *